June 18, 1929. E. J. ARMSTRONG 1,717,598
STEERING APPARATUS FOR MOTOR DRIVEN VEHICLES
Filed July 19, 1924 3 Sheets-Sheet 2
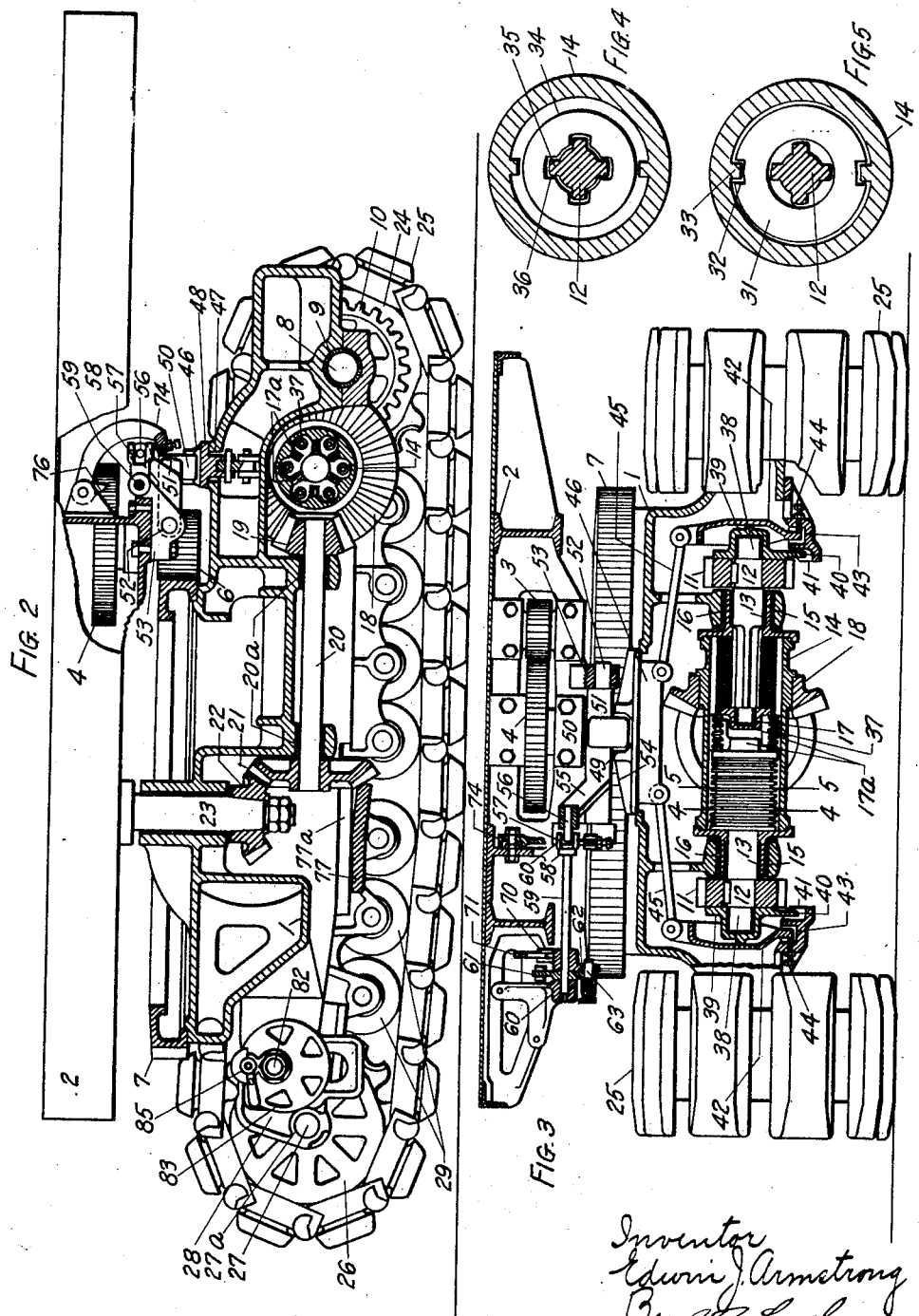
Inventor
Edwin J. Armstrong
By W. L. Losey
Attorney

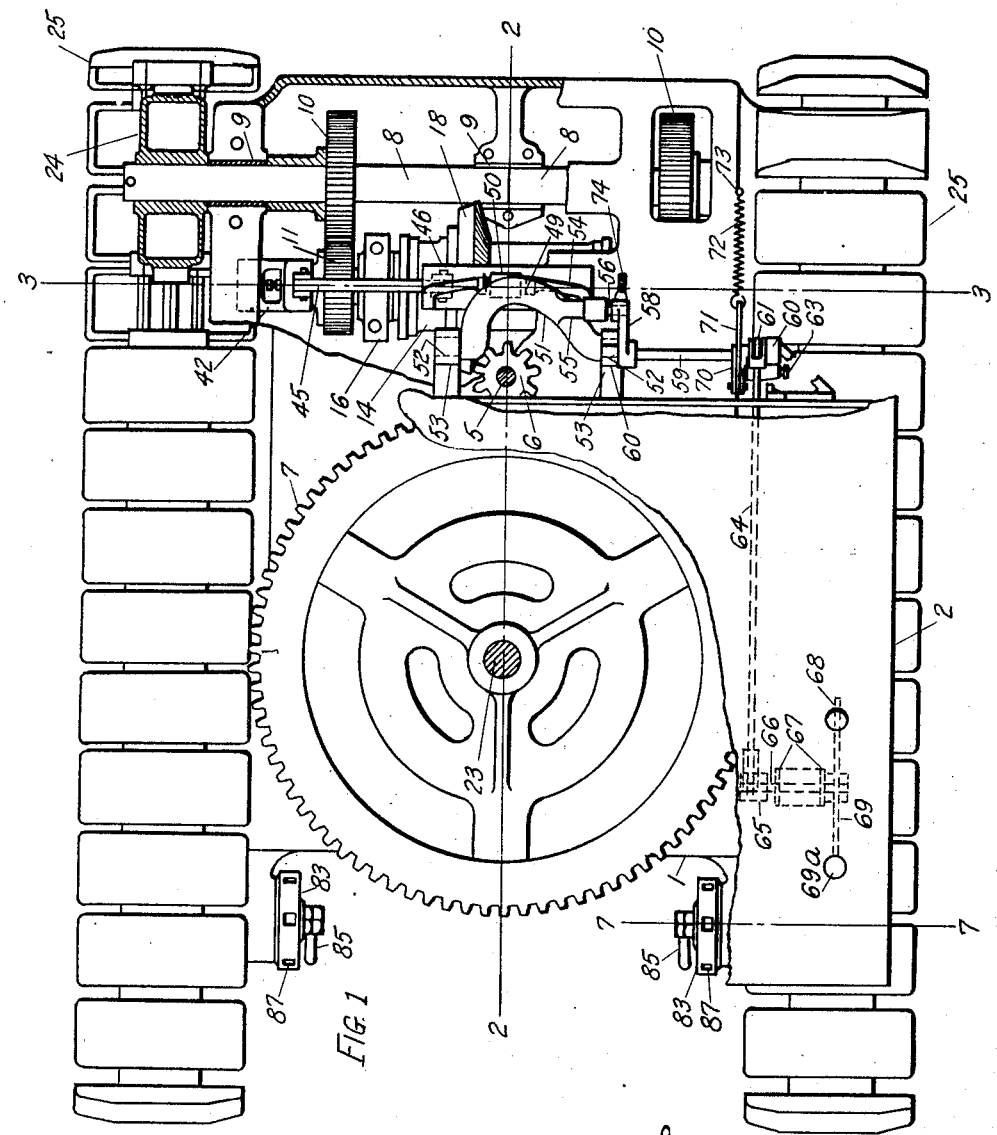

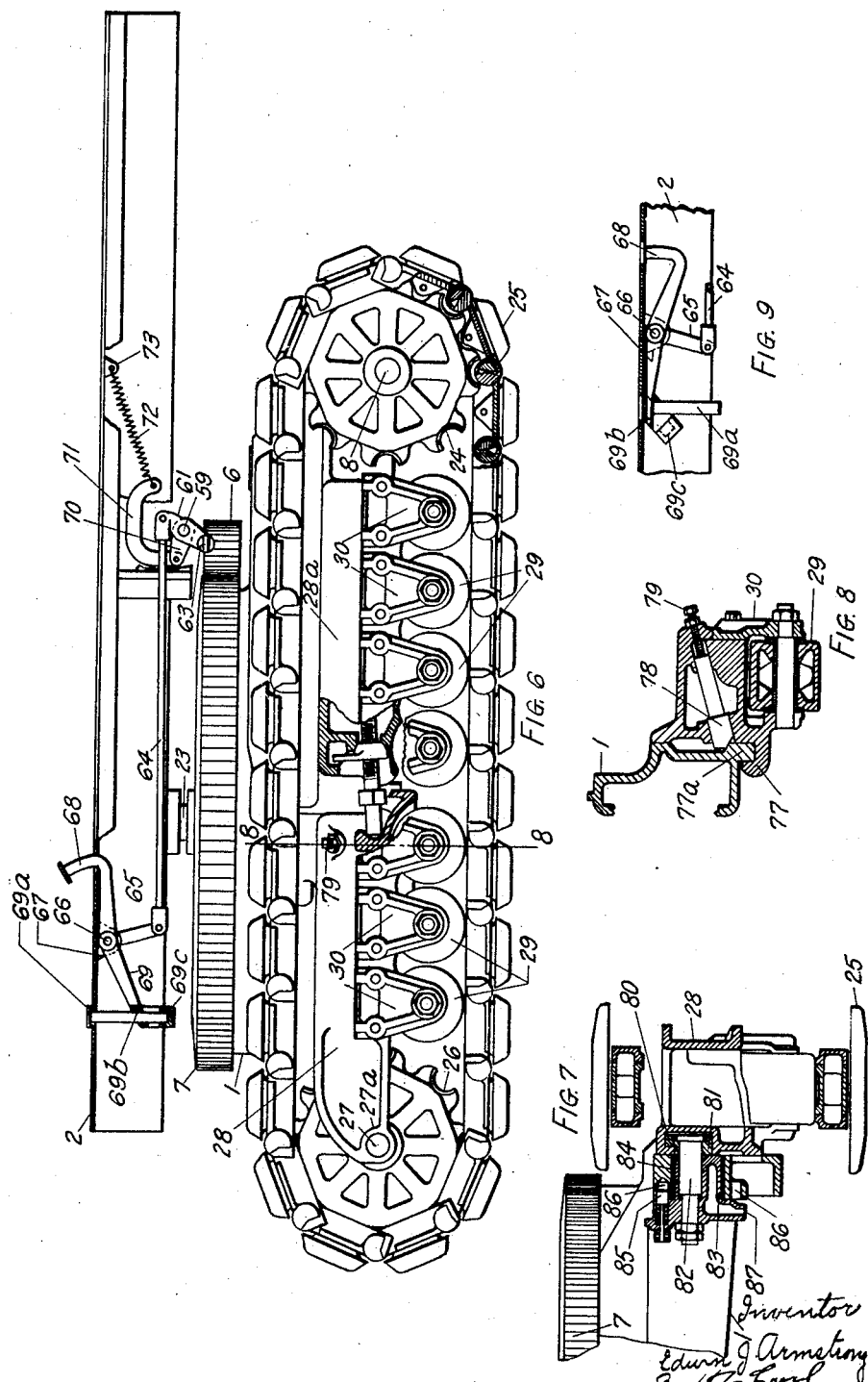

Patented June 18, 1929.

1,717,598

UNITED STATES PATENT OFFICE.

EDWIN J. ARMSTRONG, OF ERIE, PENNSYLVANIA, ASSIGNOR, BY MESNE ASSIGNMENTS, TO BUCYRUS-ERIE COMPANY, OF SOUTH MILWAUKEE, WISCONSIN, A CORPORATION OF DELAWARE.

STEERING APPARATUS FOR MOTOR-DRIVEN VEHICLES.

Application filed July 19, 1924. Serial No. 726,949.

The invention involves improvements in apparatus having revolving platforms mounted on a carriage provided with continuous or endless tracks. It is desirable to steer such apparatus by turning the platform. Thus the usual boom can be swung to the direction in which it is desired to go and the turning engine which is a part of the apparatus may be utilized for throwing the steering apparatus. It is desirable to provide a mechanism whereby this steering apparatus may be thrown into action or coupled with the table from the platform itself. It is also desirable to deflect a portion of the supports for the endless track so that the load will be carried by a portion of the track and thus reduce the turning effort. Other features and details will appear from the specification and claims.

The invention is illustrated in the accompanying drawings as follows:—

Fig. 1 shows a plan view of the device partly in section.

Fig. 2 a side elevation, partly in section, on the line 2—2 in Fig. 1.

Fig. 3 an end view, partly in section, on the line 3—3 in Fig. 1.

Fig. 4 a section on the line 4—4 in Fig. 3.

Fig. 5 a section on the line 5—5 in Fig. 3.

Fig. 6 a side elevation with slight details in section.

Fig. 7 a section on the line 7—7 in Fig. 1.

Fig. 8 a section on the line 8—8 in Fig. 6.

Fig. 9 a detail view of the operating foot lever showing it in the position assumed when out of use.

1 marks the frame and 2 the turn table. This turn table is provided with the usual operating machinery, as for example steam shovels and revolving cranes. These parts have not been shown as they are well understood. A turning gear 3 is driven from the platform and meshes with a gear 4. The gear 4 is fixed on a shaft 5. A pinion 6 is also fixed on this shaft and meshes with a frame gear 7 by means of which the table is swung.

Rear axles 8 extend each side from the center and are carried by bearings 9 in the frame. Gears 10 are mounted on the axles 8 and mesh with gears 11 on drive shafts 12. The shafts 12 are journaled in bearings 13 and these bearings are arranged in extensions 15 on a clutch sleeve 14. The extensions 15 are journaled in bearings 16 carried by the frame. The inner ends of the shafts 12 are carried in thrust bearings 17 in clutch plates 17$^a$. A beveled gear 18 is fixed on the clutch sleeve 14 and meshes with a beveled pinion 19. The beveled pinion is mounted on a shaft 20 journaled in bearings 20$^a$ extending from the frame. A beveled gear 21 is fixed on the shaft 20 and meshes with a gear 22. The gear 22 is fixed on a shaft 23 extending upwardly through the center of the table and is driven from mechanism (not shown) on the turn table. The traction effort of the machine is delivered from the shaft 23 to the axles 8.

Drive sprocket wheels 24 are fixed on the axles 8 and the continuous tracks 25 are driven by these sprockets. The forward ends of the tracks extend over idling sprockets 26 arranged on shafts 27 carried in bearings 27$^a$. The bearings 27$^a$ are in a tilting frame 28 extending from a rigid frame 28$^a$ forming a part of the main frame 1. Load supporting wheels 29 are carried in a bracket 30 extending from the frames 28 and 28$^a$.

A series of clutch plates 31 are provided with notches 32 which engage projections 33 on the interior of the clutch sleeve 14. A series of clutch plates 34 are provided with notches 35 which engage ribs 36 on the shafts 12. These plates are alternating so that when pressure is put on the end of the series all the plates operate in the ordinary manner of multiple disc clutches. The clutch plates 17$^a$ operate against the clutch discs and the clutch discs are normally forced into engagement by springs 37 which extend between the plates 17$^a$.

In steering the machine it is desirable to break the driving connection of the track at one side and at the same time lock the track at the same side against movement. This is accomplished in the present invention as follows:—The shafts 12 have the extensions 38 outside the gears 11 and these form thrust bearings with friction plates 39. The friction plates have projections 40 which extend into notches 41 in the frame and thus are locked against turning. Levers 42 extend into sockets 43 in the frame and are adjustable in the socket by means of screws 44. These levers have pockets which house or extend over a portion of the plates 39 so as to retain them in place. The upper ends of the levers are connected by links 45 with a sliding head 46. The head extends through a slot 47 in the frame having guiding flanges 48 which rest on the frame. The locking head is provided with a locking notch 49 which is adapted to receive a latch 50. The latch is carried by a trunnion 51 having bearing extensions 52 journaled in bearings 53 on the turn table. The head 46 has slanting surfaces 54 leading to the notch 49 so as to lift the latch and guide it to position at the notch.

The latch is thrown into and out of operative position by the following mechanism:— A lever 55 extends from the trunnion 51. It is provided with a pin 56 which extends into a slot 57 of a lever 58. The lever 58 is fixed on a shaft 59. The shaft 59 is journaled in bearings 60 on the platform. A lever 61 is journaled on the shaft 59 and is adapted to be locked therewith through a lever 62 which is fixed on the shaft and has a spring actuated locking pin 63 by means of which the lever 61 may be locked with the shaft 59. The lever 61 is connected by a link 64 with a lever 65. The lever 65 is fixed on a shaft 66 journaled in bearings 67 extending from the platform. A foot lever 68 is fixed on the shaft 66 and extends through the platform in position to be operated by the foot from the platform. A lever 69 is opposed to the lever 68. A push pin 69$^a$ extends through an opening 69$^b$ in the lever into a socket 69$^c$ when the lever is in operation. A lever 70 extends from the shaft 59 and a link 71 connects this lever with a spring 72 anchored at 73 on the platform. The lever 71 is so positioned with relation to the shaft 59 and the spring 72 that the line of force of the spring is swung to opposite sides of the axis of the shaft 59 as the levers 68 and 69 are operated so that when the foot lever is forced downwardly the lever as it moves over the center is snapped up by the spring 72 and held in the position until reversed by pressure on the push pin 69$^a$. Thus the latch 50 may be thrown into position to catch in the notch, or thrown out of this position from the platform by the foot of the operator. In order to prevent the latch dropping below the guiding surfaces 54 a hook 74 is arranged under the lever 58 and an adjusting screw provided by means of which the height of the latch may be adjusted. The hook also has a stop 76 which is adapted to engage the lever 58 and limit its upward movement.

In the operation of the device when the latch catches with the notch and is subjected to the turning pressure from the turning platform the pressure is delivered through the link 45, lever 42 to the shaft 12 at one end and this operating against the thrust plate 17$^a$ relieves the friction discs at one side of the pressure of the springs 37 thus breaking the driving connection at this side of the machine. At the same time the friction plate 39 is forced into frictional engagement with the gear 11 and the gear 11 forced into frictional engagement with the side of the bearing 13, thus resisting or braking the movement of the tracks at the side of the machine which has had its driving connection broken. The frame 28 can be slightly tilted so as to reduce the effective length of the track so as to simplify and reduce the steering effort. The front end of the track is elevated in Fig. 2. The rear end of the frame 28 has a hook 77 which engages a flange 77$^a$ on the frame and is locked in position by a thrust bar 78 operated upon by a thrust screw 79. The forward end has a socket 80 in which a socket head 81 is arranged and a pin 82 is locked with the socket head and extends through an eccentric bushing 83, the bushing being journaled in an opening 84 in the frame. The eccentric bushing is provided with a spring-actuated locking pin 85 adapted to extend into locking openings 86 in the frame. Thus by swinging the bushing the eccentric may be swung upwardly or downwardly thus lifting or lowering the forward end of the frame 28. Openings 87 are provided in the periphery of the outer end of the bushing into which a bar may be inserted for facilitating the turning movement of the bushing.

What I claim as new is:—

1. In a steering apparatus for motor-driven vehicles, the combination of a frame; a turn table on the frame; endless tracks at each side of the frame supporting the frame; driving mechanism for the tracks; devices actuated by the turning of the table controlling the mechanism; and spring-actuated means operable on the table controlling said devices, said means yielding and holding the devices in or out of operative position as actuated.

2. In a steering apparatus for motor-driven vehicles, the combination of a frame; a turn table on the frame; endless tracks at each side of the frame supporting the frame; driving mechanism for the tracks; devices actuated by the turning of the table controlling the mechanism; and spring-actuated foot operable means on the table, said means yielding and holding the devices in or out of operative position as actuated.

3. In a steering apparatus for motor-driven vehicles, the combination of a frame; a turn table on the frame; endless tracks at each side of the frame supporting the frame; driving mechanism for the tracks; devices actuated by the turning of the table controlling the mechanism; and spring-actuated means operable on the table controlling said devices, said spring-actuated means comprising a lever, and a spring operating on the lever with its line of force crossing the axis of the lever as it is swung whereby the lever and the means are yieldingly held in or out of operative position.

4. In a steering apparatus for motor vehicles, the combination of a frame; a turn table on the frame; endless tracks at each side of the frame supporting the frame; a driving mechanism for the tracks comprising friction clutches, one for each track; springs normally holding said friction clutches in engagement; and devices actuated by the turn table and acting upon the springs as the turn table is swung to release one or the other of said clutches from the pressure of the springs to break the driving connection at one, or the other side of the vehicle, said springs holding the clutches in engagement when released from the force of the table and acting as a buffer for the table as they are actuated by the table to release the clutches.

5. In a steering apparatus for motor vehicles, the combination of a frame; a turn table on the frame; endless tracks at each side of the frame supporting the frame; a driving mechanism for the tracks comprising friction clutches; one for each track; springs normally holding said friction clutches in engagement; devices actuated by the turn table and acting upon the springs as the turn table is swung to release one or the other of said clutches from the pressure of the springs to break the driving connection at one, or the other side of the vehicle, said springs holding the clutches in engagement when released from the force of the table and acting as a buffer for the table as they are actuated by the table to release the clutches; and means actuated by a continued movement of the turn table after releasing the clutch frictionally retarding the track at the side released.

In testimony whereof I have hereunto set my hand.

EDWIN J. ARMSTRONG.